United States Patent [19]
Wilson

[11] Patent Number: 5,299,651
[45] Date of Patent: Apr. 5, 1994

[54] TRUCK CAB SUSPENSION SYSTEM

[75] Inventor: B. Lee Wilson, Ft. Wayne, Ind.

[73] Assignee: Navistar International Transportation Corp., Chicago, Ill.

[21] Appl. No.: 918,110

[22] Filed: Jul. 2, 1992

[51] Int. Cl.⁵ .............................................. B62D 33/06
[52] U.S. Cl. .................................................. 180/89.12
[58] Field of Search ............... 180/89.12, 89.14, 89.15, 180/89.16; 280/723; 296/35.1, 190

[56] References Cited

U.S. PATENT DOCUMENTS

| | | | |
|---|---|---|---|
| 3,797,883 | 3/1974 | Steiner et al. | 180/89.15 |
| 3,948,341 | 4/1976 | Foster | 180/89.15 |
| 4,253,700 | 3/1981 | DiFrancescantonio | 180/89.14 |
| 4,556,118 | 12/1985 | London | 180/89.15 |
| 4,998,592 | 3/1991 | Londt et al. | 180/89.12 |
| 5,044,455 | 9/1991 | Tecco et al. | 180/89.13 |
| 5,249,652 | 10/1993 | Leitzman et al. | 188/282 |

FOREIGN PATENT DOCUMENTS

| | | | |
|---|---|---|---|
| 0067180 | 4/1984 | Japan | 180/89.12 |
| 0060480 | 3/1989 | Japan | 296/190 |

Primary Examiner—Margaret A. Focarino
Assistant Examiner—Paul Dickson
Attorney, Agent, or Firm—Dennis K. Sullivan

[57] ABSTRACT

A cab suspension system comprises an active, computer controlled damping mechanism positioned between the cab and the truck frame, at the rear of the cab. Further, corner mounted high and low level passive damping mechanisms are provided at the front of the cab. Also, a torsion bar is engaged centrally across the frame members beneath the cab, the torsion bar controlling side roll and sway, as well as acting as a radius rod to limited fore-aft travel of the cab.

19 Claims, 1 Drawing Sheet

TRUCK CAB SUSPENSION SYSTEM

CROSS REFERENCE TO RELATED APPLICATIONS

This application is related to U.S. patent application Ser. No. 07/501,452, filed Jun. 19, 1992, by Noel E. Lietzman and Robert J. Selzer and assigned to the assignee hereof, now U.S. Pat. No. 5,249,652.

BACKGROUND OF THE INVENTION

The present invention relates to a cab suspension system for a truck and includes an active rear mount system and a front mount system with variable damping capability. More specifically, the active rear mount system is a single point system which operates under the action of a computer controller and the front mount system includes high and low damping rate elements which may incorporate a lost motion connection therein.

THE PRIOR ART

Heretofore, an actively controlled truck cab suspension has been proposed in U.S. Pat. No. 5,044,455. This system includes a single point hydraulic actuator mounted at the rear of the cab between the cab and the frame on which the cab is mounted. The system is computer controlled, and a feedback circuit is also provided which verifies activation of the system in accordance with calculations provided by an algorithm being run in the controller. The primary actuator in this system comprises an air bag or coil spring which supports the static load imposed by the rear end of the cab. A secondary hydraulic actuator, which is computer controlled, causes incremental movements of the rear end of the cab to minimize pitching motion of the cab.

U.S. Pat. No. 4,998,592 teaches a passive mechanical damping system for a truck cab which impedes free movement of a cab of the truck relative to a frame of the truck. Progressive damping of movement of the cab is accomplished by provision of a lost motion connection thereon which provides maximum vibration isolation while providing additional damping to control cab movement when preset displacement limits are exceeded. The system includes a low level viscous damper, a high level viscous damper, and a lost motion connection which also activates the high level viscous damper.

Nowhere is there disclosed a combined active rear and variable damping front mounting system for a truck cab.

SUMMARY OF THE INVENTION

Accordingly, it is a primary object of the invention to provide an active cab suspension system which includes an active suspension system at the rear of the cab with a low rate variable damping system at the front of the cab.

A further object is to incorporate a lost motion connector or rattle space within the front suspension system.

A still further object is to incorporate a stiff torsion rod into the suspension system to control side roll and sway and to act as a radius rod to limit fore-aft travel of the cab.

A yet further object is to provide a cab suspension system wherein the front end of the cab is suspended on low rate damping devices and wherein the rear end of the cab is provided low rate damping devices in parallel with an active device or may be realized in an active air spring.

BRIEF DESCRIPTION OF THE DRAWINGS

Other objects and advantages of the invention will become more apparent upon perusal of the detailed description thereof and upon inspection of the drawings in which.

DESCRIPTION OF THE PREFERRED EMBODIMENT

Figure 1:
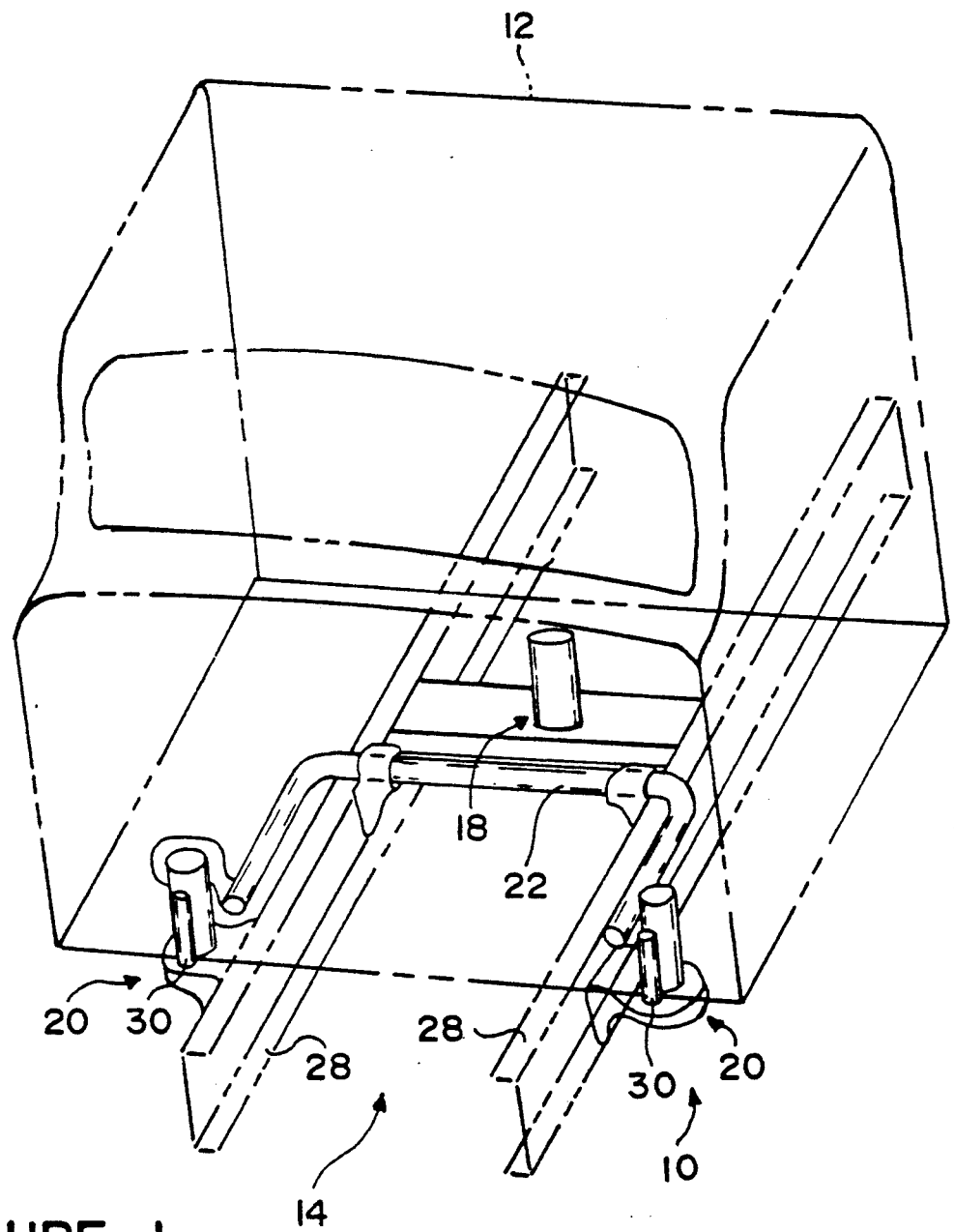
FIG. 1 is a perspective view of the suspension system of the present invention showing placement thereof relative to a truck cab and frame, both of which are illustrated in phantom.

Referring now to the drawing in greater detail, there is illustrated therein the cab suspension system 10 of the present invention.

The suspension system 10 is mounted between a cab 12 and a frame 14 of a truck.

As illustrated, the suspension system 10, in a preferred embodiment thereof, incorporates a single point rear cab actuator 18 and a corner point pair of front actuators 20.

Further, to control side roll, sway and fore-aft pitch, the system 10 includes a stiff torsion bar 22 which acts as a radius rod, allowing for provision of the single point rear cab actuator 18 as well. The torsion bar 22 straddles frame members 28 of the frame 14 below the cab 12 and is centered relative thereto. The torsion bar 22 further is elevated above the frame members 28 engaging an underside of the cab 12.

The rear actuator 18 comprises an active element which may be realized in two forms.

In the first form the actuator 18 may incorporate a low rate mechanical or air spring in parallel with an active device such as the hydraulic actuator disclosed in U.S. Pat. No. 5,044,455. which is incorporated by reference herein. Alternatively, an active air spring could be used alone.

In either embodiment, function of the actuator 18 is under control of a computer which includes a sensor system and is programmed with an algorithm as disclosed in U.S. Pat. No. 5,044,455 as well.

Turning now to the front cab pair of corner mounted actuators 20, such front actuators 20 are realized in low rate springs, either air operated or mechanical, and, to provide two stage damping capability, may be combined with two stage damping actuators 30. The front actuators may also include a primary low level damping device and a secondary high level damping device, the secondary high level damping device comprising a shock absorber incorporating a lost motion connection therein as in U.S. Pat. No. 4,998,592 to Londt et al. which is incorporated by reference herein.

Such two stage damping actuator 30 is disclosed in the above-mentioned copending U.S. patent application Ser. No. 07/901,452, filed Jun. 19, 1992, now U.S. Pat. No. 5,249,652, which is incorporated by reference herein. Alternatively, the passive mechanical damping system disclosed in U.S. Pat. No. 4,998,592 described above could be utilized in place of the actuators 30. In either case, lost motion is provided to prevent high rate damping from occurring unless preset displacement limits are exceeded.

The front cab actuators 20 in the preferred embodiment requires no external controller, acting in unison with the rear actuator 18 to maintain level positioning of the cab 12, and further being assisted in this leveling by the torsion bar 22.

The springs, as described above, act as the primary suspension components, and, being of low rate, provide a very low resonant frequency, isolating the cab from low level vibration.

The active hydraulic actuator 18, together with the high rate damping actuators 30 on the front end of the cab 12 only come into play when vibrations exceed a predefined minimum level.

Obviously, if desired, more than one actuator 18 may be provided at the rear of the cab 12. If multiple actuators 18 are installed, they would be simultaneously, as a single functional unit, effectively controlled in the pitch plane.

As described above, the cab suspension system 10 of the present invention has a number of advantages, some of which have been described above and others of which are inherent in the invention. Also, modifications may be proposed to the system 10 without departing from the teachings herein. Accordingly the scope of the invention is only to be limited as necessitated by the accompanying claims.

What is claimed is:

1. A cab suspension system for vibrationally isolating a truck cab, said cab having a front portion and a rear portion, from a frame of a truck, said suspension system including:
    an active damping mechanism at the rear of the cab which is operated under computer control in response to an algorithm programmed into the computer;
    sensors associated with the computer for sensing cab position;
    a feedback circuit for sensing actuation of the active damping mechanism; and,
    at least one passive damping mechanism at the front of the cab including a primary low level damping device and a secondary high level damping device, said secondary high level damping device at the front of said cab comprising a shock absorber incorporating a lost motion connection therein.

2. The system of claim 1 further including a stiff torsion bar positioned centrally beneath the cab and extending across the frame thereunder for controlling side roll, sway, and fore-aft pitch.

3. A cab suspension system for vibrationally isolating a truck cab, said cab having a front portion and a rear portion, from a frame of a truck, said suspension system including:
    an active damping mechanism at the rear of the cab which is operated under computer control in response to an algorithm programmed into the computer;
    sensors associated with the computer for sensing cab position;
    a feedback circuit for sensing actuation of the active damping mechanism; and,
    at least one passive damping mechanism at the front of the cab including a primary low level damping device and a secondary high level damping device, said secondary damping device being activated only when predefined limits of motion of said front of said cab are exceeded; and
    a torsion bar engaged beneath said cab straddling said frame beneath said cab for control of side roll, sway and fore-aft travel of the cab.

4. The system of claim 3 wherein said torsion bar is elevated above said frame, engaging an underside of said cab.

5. The system of claim 4 wherein said primary damping device comprises an air spring.

6. The system of claim 5 wherein said secondary damping device comprises a shock absorber.

7. The system of claim 6 wherein said shock absorber incorporates a lost motion connection therein.

8. The system of claim 4 wherein said primary damping device comprises a mechanical spring.

9. A suspension system for a truck cab, said cab having a front portion and a rear portion, including an active rear suspension, and a variable rate front suspension, said active rear suspension comprising a passive member and an active member operated under computer control; said variable rate front suspension comprising a spring member and an unitary two stage passive damping mechanism including a primary low level damper which operates within predefined limits and a secondary high level damper which is activated only when said predefined limits thereof are exceeded.

10. The system of claim 9 wherein said front suspension is a two corner mounted system.

11. The system of claim 10 wherein each corner mounted system includes a low rate spring in each corner.

12. The system of claim 11 wherein each corner mounted system further includes a two stage shock absorber.

13. The system of claim 12 wherein said two stage shock absorber includes a low level damping mechanism which activates a high level damping mechanism when predefined limits of the low level damping mechanism are exceeded.

14. The system of claim 13 wherein said active suspension comprises an hydraulic actuator in parallel with a low rate spring.

15. The system of claim 14 wherein said low rate spring is mechanical.

16. The system of claim 15 wherein said low rate spring is an air spring.

17. The system of claim 16 wherein said active suspension comprises an air spring.

18. The system of claim 17 wherein said rear suspension is a single point system centered beneath the rear of the cab.

19. The system of claim 18 wherein said low rate spring is preset with regard to support parameters and serve as a primary actuator.

* * * * *